F. D. APPLETON.
STOP FOR TALKING MACHINES.
APPLICATION FILED MAR. 11, 1921.

1,436,561.

Patented Nov. 21, 1922.

Frank D. Appleton.
INVENTOR

BY *Victor J. Evans*
ATTORNEY

Patented Nov. 21, 1922.

1,436,561

UNITED STATES PATENT OFFICE.

FRANK D. APPLETON, OF PHILADELPHIA, PENNSYLVANIA.

STOP FOR TALKING MACHINES.

Application filed March 11, 1921. Serial No. 451,557.

*To all whom it may concern:*

Be it known that I, FRANK D. APPLETON, a citizen of the United States, residing at Philadelphia, in the county of Philadelphia and State of Pennsylvania, have invented new and useful Improvements in Stops for Talking Machines, of which the following is a specification.

This invention relates to stop mechanisms for phonographs and has for its main object the provision of means for stopping rotation of the phonograph platen.

Another object of the invention is to provide means through contact with a record rotatable with a platen and co-acting with a brake for stopping rotation of the platen.

Another object of the invention is to provide a stop mechanism for phonographs adapted to contact with a disc rotatable with a platen and operable to disengage a stylus from grooves in the disc.

Another object of the invention is to provide a stop mechanism for phonographs adapted to contact with a disc rotatable with a platen and operable to disengage a stylus from grooves in the disc and stop rotation of the platen.

Another object of the invention is to provide a brake for a rotatable platen operable by a member movable across a record rotating with the platen.

Another object of the invention is to provide a stop mechanism for phonographs including a stop member operable to contact with a record rotating with a platen for reducing the speed of the platen prior to movement of the stop mechanism across the disc.

Another object of the invention is to provide a stop mechanism for contact with a phonograph record which will not mar or otherwise injure the record in rotatable contact therebetween.

Another object of the invention is to provide a brake of simple construction for engagement with the edge of the platen and operable by stop mechanism movable above the platen.

Another object of the invention is to provide a stop mechanism for phonographs which is simple in construction and operation, inexpensive to manufacture, and which is especially adapted for attachment with a sound box and member mounted for pivotal movement above the platen.

The above and other objects of my invention are obtained in the structure described in detail in the following specification and illustrated in the accompanying drawings, and wherein:—

Figure 1:
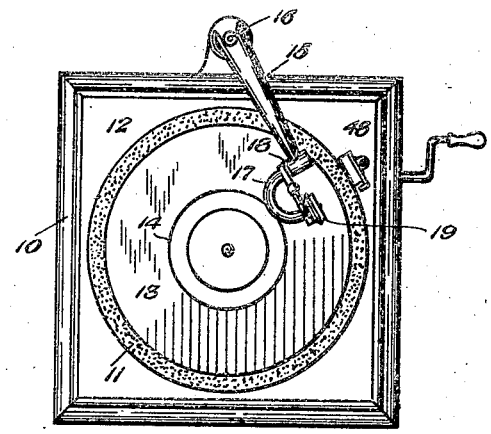
Figure 1 is a top plan view of a phonograph showing my invention attached for operation therewith.

Referring to the drawings a phongraph having the usual cabinet 10, is provided with a platen 11 mounted for rotation above the top 12 of the phonograph cabinet, to receive a disc record 13 concentrically disposed on the platen 11. The record 13 may be provided with a substantially deep circumferential groove 14 concentric and adjacent the innermost reproducing groove of the record. Mounted for movement over the platen 11 is a sound conduit arm 15 having one end pivotally connected at 16 to the side of the cabinet and carrying a goose neck 17 pivotally connected at 18 to the opposite end of the conduit arm. A sound box 19, connected with the goose neck 17, is provided with the usual stylus holder 20 for receiving a stylus 21 adapted to be secured in the holder by a set screw 22.

Mounted adjacent the pivot point of the goose neck is a depending bracket 23, the upper end of which is bent to form a loop portion 24 extending around one branch of the goose neck 17 and rigidly clamped thereto by a bolt 25 which extends through substantially aligned openings in the bracket 23 and the end of the loop portion 24, to receive a nut 26 having threaded engagement with the free end of the bolt. The bracket 23 is disposed between depending sides of a bifurcated bracket 27, riveted at 28 to the upper side of the bracket 23, and mounted for rotary movement between the depending sides of the bracket 27 is a cam shaped stop member 29 supported by a pin 30 extending transversely through the stop member and aligned openings in the sides of the bracket 27, the stop member being provided with an outwardly extending stop pin 31, the purpose of which will presently appear.

A bracket 32 of spring metal is bent in substantially right angular shape to form sides 33 and 34, the sides 33 having adjacent the end thereof an integral ear 35 for attachment to the sound box 19 by a set screw 36, to rigidly secure the bracket to the sound box with the sides 33 and 34 substantially parallel and vertical respectively with the platen 11 when the stylus 21 is in engagement with the record 13. The side 34, which depends vertically between the branches of the goose neck is bent at the end thereof to form a trip 37 normally spaced from the stop member, and positioned on the side 33 adjacent the bend in the bracket is a button 38 adapted to be depressed against the tension of the bracket material.

Figure 4:
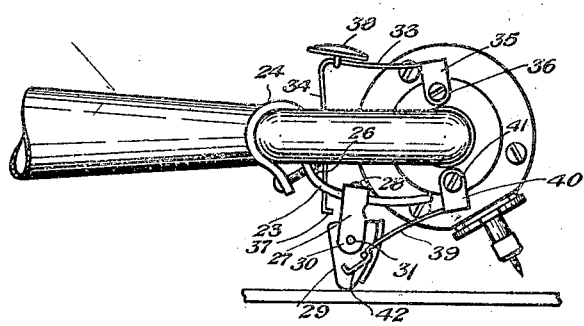
Figure 4 is a side elevation with parts broken away showing the attaching means for the stop mechanism and the stop member in engagement with the record, the stylus being disengaged from the grooves of the record.

A leaf spring 39 is provided at one end with an integral ear 40 secured to the sound box 19 by a set screw 41 for rigidly securing the leaf spring to the sound box. The opposite end of the leaf spring is bent to form a hook 42 which engages the pin 31 to normally hold the stop member 29 out of engagement with the record 13. Adjacent the hook 42, the leaf spring is bent to form a shoulder or detent 43 co-acting with the pin 31 when the stop member 29 is in contact with the record, as shown in Figure 4.

Figure 5:
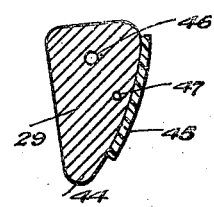
Figure 5 is a vertical cross sectional view through the stop member.

Referring to Figure 5 the cam shaped stop member is provided with an arcuate shaped toe portion 44 the curved outer surface of which is highly polished. A shoe 45 of soft rubber is glued or otherwise attached to the cam shaped surface of the stop member, the purpose of which and the polished curved surface of the toe portion 44 will presently appear. The stop member is further provided with transversely disposed openings 46 and 47 for receiving the pins 30 and 31 respectively.

Mounted on the top 12, adjacent the circular edge of the platen 11, is a brake designated broadly at 48, and the brake includes a bracket 49 firmly secured to the top 12 by a screw 50, and a brake member 51 centrally pivoted at 52 to the vertical side of the bracket 49. The brake member 51 comprises a plate bent to form a normally level rest portion 53, an arm 54 transversely disposed across and in spaced relation with the rest portion 53, and a depending portion 55 carrying adjacent the end thereof a brake shoe 56 of rubber or other suitable material for engagement with the edge of the platen and normally having spaced relation therewith.

In operation, when it is desired to stop the revolving platen and raise the sound box to disengage the stylus from the grooves of the record, the button 38 is depressed, causing the trip 37 to engage and turn the stop member 29 about the pivot pin 30. The shoe 45 will then engage the record 13 to lift the sound box and disengage the stylus from the record, the friction between the shoe and the record reducing the speed of the revolving platen before the polished curved surface of the toe portion 44 comes in contact with the record. When the toe portion 44 is in contact with the record, as shown in Figure 4, the pin 31 engages the shoulder 43 of the spring 39, preventing further forward movement of the stop member. At the instant the toe portion 44 becomes engaged with the revolving record, the arm 15 will be thrown outwardly, carrying therewith the sound box and stylus which have previously been lifted in spaced relation above the record. The toe portion 44 is in direct contact with the revolving record until the arm 15 reaches its extreme outward position adjacent the brake 48, when the toe portion 44 will slide from the record to a position on the platen adjacent the edge thereof, the stylus holder resting on the portion 53 and striking the arm 54 to prevent further movement of the arm 15 and operate the brake. The combined weight of the goose neck, sound box, and stop mechanism striking the arm 54 will turn the brake member 51 about its pivot 52, thereby swinging the brake shoe 56 inwardly to engage the edge of the platen 11 and with the stop member in engagement with the platen will stop further rotation of the latter.

Figure 2:
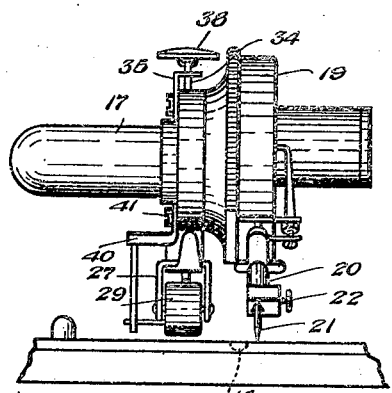
Figure 2 is a front view showing the stop mechanism applied to the sound box and its pivoted support, parts of the platen and record being broken away, the stop mechanism in inoperative position.
Figure 3:
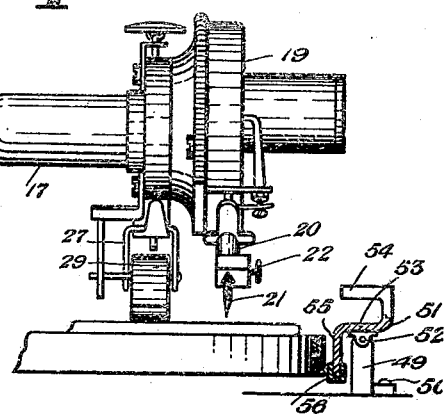
Figure 3 is a view similar to Figure 2, showing the brake positioned adjacent the edge of the platen, and the stop mechanism in operative position with the sound box and stylus lifted above the record.

Referring to Figure 2 when the stylus 21 has reached the innermost reproducing groove of the rotating record, the former will drop into the substantially deep groove 14 allowing the shoe 45 of the stop member 29 to engage the record for automatically stopping the platen or reducing the speed of rotation thereof. It will appear obvious that the leaf spring 39 engaging the pin 31 will turn the stop member back to inoperative position, the hook 42 limiting the rearward movement of the stop member, this operation occuring after the stop member has been lifted with the sound box and stylus above the record. It will further appear obvious that my invention is susceptible to various changes in construction embodying modifications which would be within the spirit of the invention without departing from the scope of the following claims, it being understood that this disclosure is by way of illustration only and is not to be taken as constrictive of my conception.

What I claim is:—

1. In a stop mechanism for phonographs, a support mounted over a rotatable disc, a stop member pivotally mounted on the support, and means carried by the support operable to move said stop member to engage the disc, and means for limiting movement of the stop member and operable to return the latter to inoperative position.

2. A stop mechanism for phonographs including a support mounted for pivotal and swinging movement above a rotatable disc, a right angular shaped bracket adapted for attachment at one end to the support and provided at its opposite end with a foot portion, a bracket carried by the support and depending below the said foot portion of the first mentioned bracket, a stop member supported in normally inoperative position by said last mentioned bracket, said stop member being operable to engage the disc by depression of said first mentioned bracket, and means carried by the support and co-acting with the stop member for limiting the forward motion thereof.

3. A stop mechanism for phonographs including a support mounted for pivotal and swinging movement above a rotatable disc, a stop member mounted for rotation on said support, means operable to engage said stop member for contact with the disc, and means for limiting the forward movement of said stop member and supporting the latter in inoperative position, said means comprising a leaf spring one end of which is secured to the support and the opposite end having a hook and shoulder for engagement with the stop member in its inoperative and operative positions respectively.

In testimony whereof I affix my signature.

FRANK D. APPLETON.